（12）United States Patent
Park et al.

(10) Patent No.: US 7,953,052 B2
(45) Date of Patent: May 31, 2011

(54) INTER-TECHNOLOGY HANDOFF METHOD IN AN IP-BASED WIRELESS COMMUNICATION SYSTEM (75) Inventors: Chi-Hyun Park, Yongin-si (KR); Pil-Yong Hwang, Yongin-si (KR); Young-Hwan Lee, Gimhae-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1642 days.

(21) Appl. No.: 10/994,751

(22) Filed: Nov. 22, 2004

(65) Prior Publication Data
US 2005/0130660 A1 Jun. 16, 2005

(30) Foreign Application Priority Data
Dec. 2, 2003 (KR) .......................... 10-2003-0086792

(51) Int. Cl.
H04W 4/00 (2009.01)
H04W 36/00 (2009.01)
(52) U.S. Cl. .................... 370/338; 455/436; 455/437
(58) Field of Classification Search .................... 370/338
See application file for complete search history.

(56) References Cited

U.S. PATENT DOCUMENTS

| | | | | |
|---|---|---|---|---|
| 6,487,406 B1 * | 11/2002 | Chang et al. | ............... | 455/422.1 |
| 6,708,030 B1 * | 3/2004 | Horikawa | ...................... | 455/436 |
| 6,775,253 B1 * | 8/2004 | Agrawal et al. | ............... | 370/329 |
| 6,999,434 B1 * | 2/2006 | Agrawal et al. | ............... | 370/331 |
| 2001/0044305 A1 | 11/2001 | Reddy et al. | | |
| 2002/0196753 A1 | 12/2002 | Famolari | | |
| 2003/0119480 A1 | 6/2003 | Mohammed | | |
| 2003/0185172 A1 | 10/2003 | Rue | | |

FOREIGN PATENT DOCUMENTS
WO WO 03/017689 2/2003

OTHER PUBLICATIONS

Montavont et al., "Handover Management for Mobile Nodes in IPV6 Networks", IEEE Communications Magazine, Aug. 2002.
Rajeev Koodli, "Fast Handovers for Mobile 1-28 IPv6", Mobile IP Working Group, Mar. 1, 2003.
Vivaldi et al., "Routing Scheme for Macro Mobility Handover in Hierarchical Mobile IPv6 Network", 4th National Conference on Telecommunication Technology Proceedings, Jan. 14, 2003.

* cited by examiner

Primary Examiner — Marivelisse Santiago-Cordero
(74) Attorney, Agent, or Firm — NSIP Law (57) ABSTRACT

A handoff method in a communication system where BSs providing different radio access interfaces to an MS are connected to an IP-based network through routers. A handoff from a first BS to a second BS is decided for an MS that receives IP service data from the first BS and an L2 connection is established between the MS and the second BS. During the L2 connection establishment, movement of the MS in the IP network is detected. Handoff negotiations are conducted between the first and second BSs by IP signaling. If the handoff is available according to the negotiations, mobility management control is performed considering movement of the MS. The IP service data is transmitted to the MS in a network path reset to the second BS by the mobility management control and an L2 connection is released between the MS and the first BS.

25 Claims, 8 Drawing Sheets

FIG.7 ved on Dec. 2, 2003 and# INTER-TECHNOLOGY HANDOFF METHOD IN AN IP-BASED WIRELESS COMMUNICATION SYSTEM

PRIORITY

This application claims priority under 35 U.S.C. §119 to an application entitled "Inter-Technology Handoff Method in an IP-Based Wireless Communication System" filed in the Korean Intellectual Property Office on Dec. 2, 2003 and assigned Ser. No. 2003-86792, the contents of which are incorporated herein by reference.

BACKGROUND OF THE INVENTION

1. Field of the Invention

The present invention relates generally to a mobile communication system, and in particular, to an inter-technology handoff method in an IP (Internet Protocol)-based mobile communication network including radio access networks that use different radio access protocols.

2. Description of the Related Art

Figure 1:
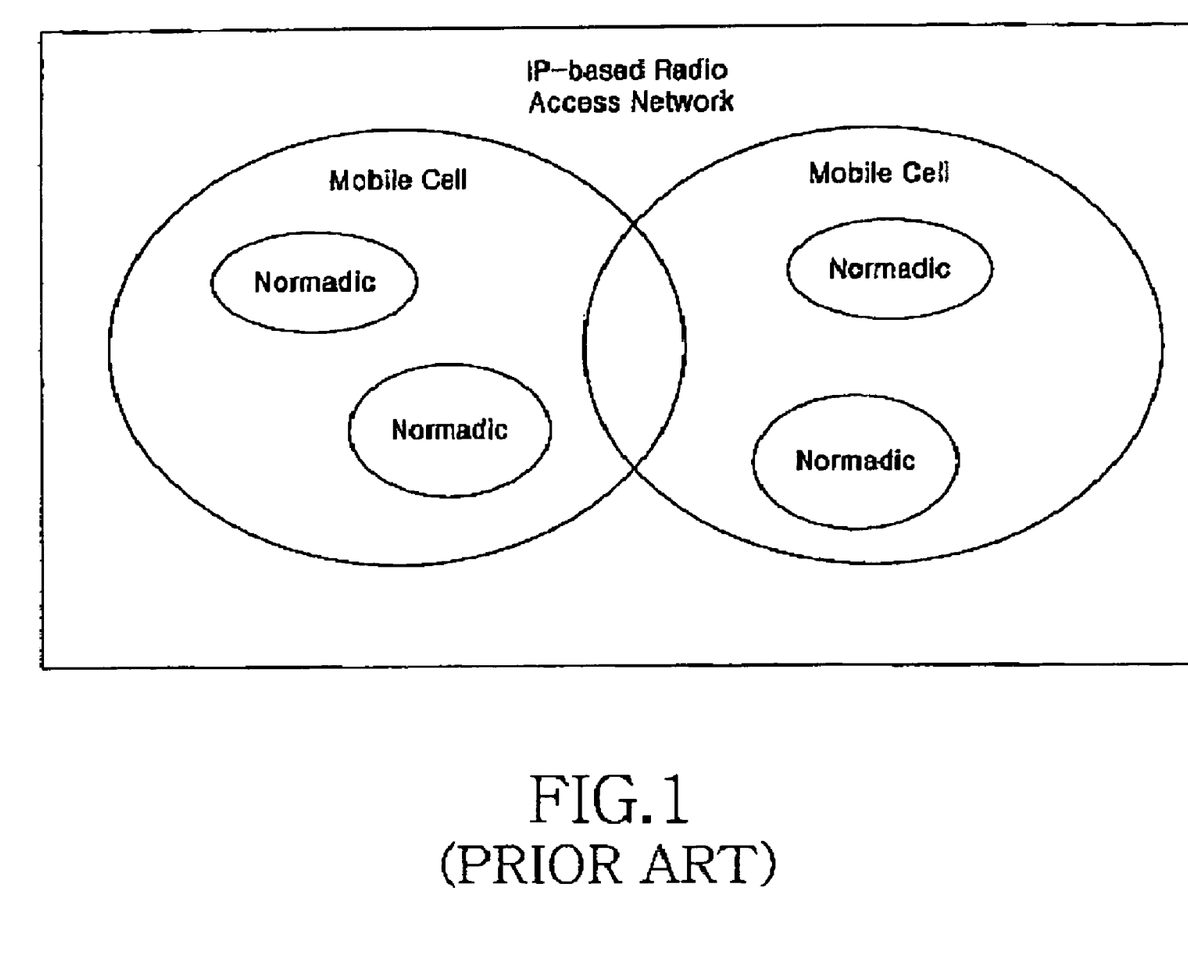
FIG. 1 is a schematic view illustrating a cellular environment with overlapped different communication.

Along with the rapid development of wireless communication technology, demands for IP-based wireless data service are growing. The technological development and user demands in the market have driven development and commercialization of wireless communication networks that differ in capacity, speed, and mobility support. FIG. 1 is a schematic view illustrating a cellular environment with different overlapped radio access networks. To provide communication services in the cellular environment, a mobile station (MS) must be equipped with multiple interfaces. Also, to provide communication services to the MS without interruption while it is roaming, an effective handoff technology is required.

Mobile IP service is available on existing IP networks. The mobile IP service is designed to reset a routing path for an MS that moves between networks in different subnets. By using the mobile IP service, the MS detects a new IP subnet (L3 movement detection), generates a new IP address or has it assigned, binds the IP address to the network, and transmits data to the IP address. The mobile IP operation is carried out when a physical connection (L2 connection) is completed between the MS and a new base station (BS), and the physical connection involves authentication and registration.

In other words, to implement a handoff between BSs or networks having different characteristics in terms of their respective service providers, QoS (Quality of Service), cell size, and mobility support, a physical connection to a new BS, an operation for authentication in regard to a handoff request from an MS and support of a continuous service between BSs, and an operation for resetting a routing path for seamless delivery of IP service must be carried out.

Figure 2:
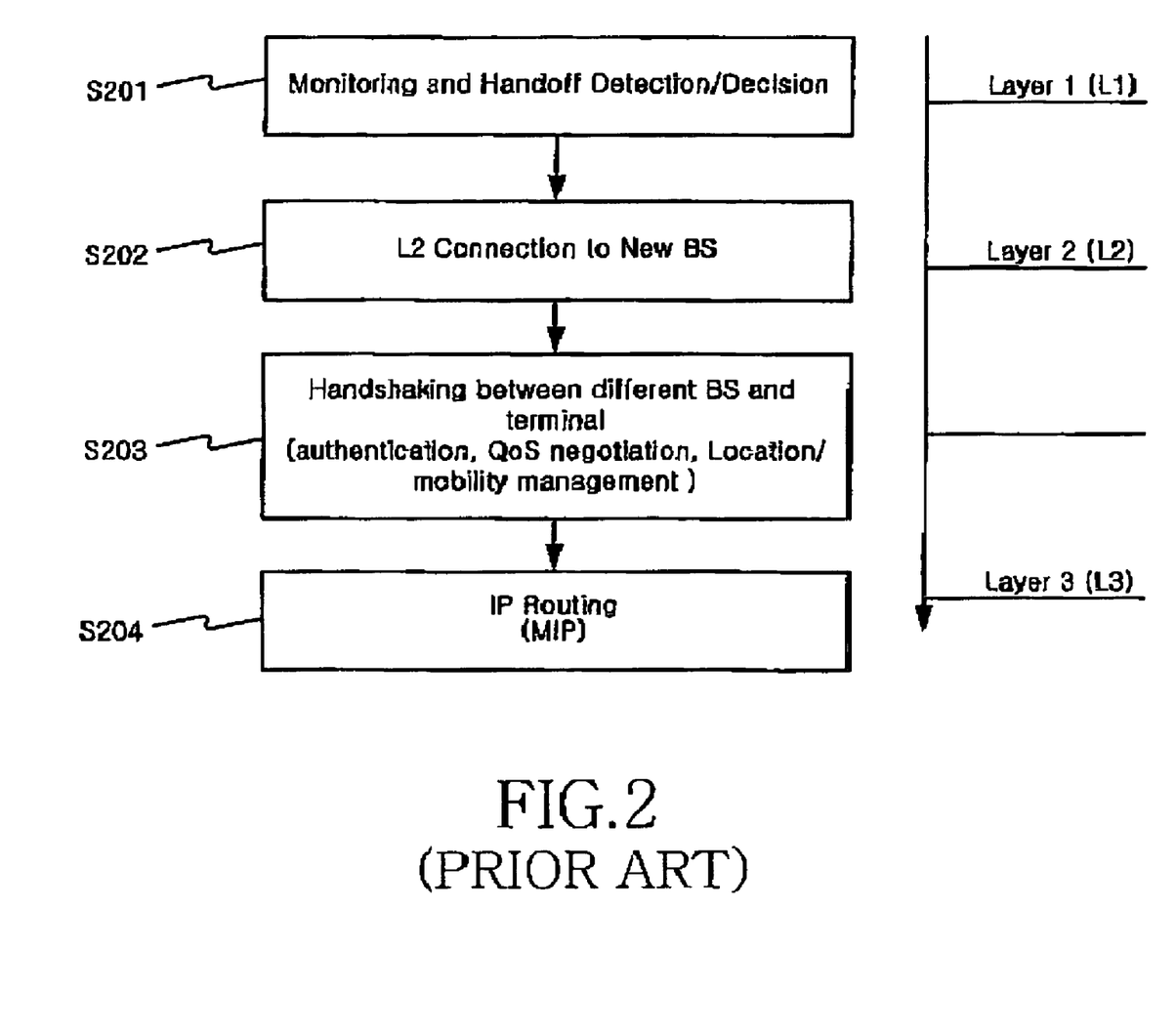
FIG. 2 is a flowchart schematically illustrating a typical IP-based inter-technology handoff procedure.

FIG. 2 is a flowchart illustrating a typical IP-based inter-technology handoff procedure. Referring to FIG. 2, an MS searches for BSs automatically autonomously or according to a network policy, detects a handoff situation, and decides to perform a handoff in step S201. A physical connection is established between the MS and a new BS in step S202 and messages are exchanged between old and new BSs, for authentication, QoS negotiations, location and mobility management in step S203. Then, an IP routing path is reset in step S204 according to Mobile IP practice.

Due to the complexity of an IP mobility operation, however, the mobile IP handoff procedure may cause a handoff delay, thereby degrading the quality of communication service.

SUMMARY OF THE INVENTION

An object of the present invention is to address the above problems and/or disadvantages and to provide at least the advantages below. Accordingly, an object of the present invention is to provide a handoff method for minimizing a service delay involved in a handoff mobility operation at an inter-technological handoff by detecting mobile station movement between IP domains, also known as IP movement in advance during establishing an L2 connection considering an IP-based handoff.

Another object of the present invention is to provide a handoff method for increasing handoff reliability by selectively setting a signaling path depending on whether an MS can be connected to two BSs simultaneously in an IP signaling procedure for a handoff between the BSs.

A further object of the present invention is to provide a handoff method commonly applicable to BSs that provide different IP-based radio access interfaces.

The above objects are achieved by providing a handoff method in a communication system where BSs providing different radio access interfaces to an MS are connected to an IP-based network through routers. A handoff from a first BS to a second BS is decided for an MS that receives IP service data from the first BS and an L2 connection is established between the MS and the second BS. During the L2 connection establishment, the movement of the MS in the IP network is detected. Handoff negotiations are conducted between the first and second BSs by IP signaling. If the handoff is available according to the negotiations, mobility management is performed considering the movement of the MS. The IP service data is transmitted to the MS in a network path reset to the second BS by the mobility management and an L2 connection is released between the MS and the first BS. It is preferred that the mobility management is performed based on the mobile IP.

In the L2 connection establishment step, the MS requests the L2 connection to the second BS in an L2 connection request message, the second BS authenticates the MS based on the L2 connection request message, and if the MS passes the authentication, the second BS notifies the MS of completion of the L2 connection in an L2 success response message containing the IP address of the second BS or a router connected to the second BS.

When the first BS receives the L2 connection success response message, it transmits the same data as the IP service data transmitted to the MS to the second BS.

In the movement detection step, the IP address of the second BS or the router connected to the second BS is compared with a known IP address of the first BS or a router connected to the first BS and it is determined whether the movement of the MS is movement within the same subnet or to a different subnet.

In the handoff negotiations step, the MS determines whether it is possible to concurrently connect the MS to both the first and second BSs and transmits a handoff request message with a bypass flag set to true or false according to the determination to the first BS. The first BS refers to the bypass flag and transmits a handoff notification message with a bypass flag set to false, if the received bypass flag indicates false, to the second BS over the network on a wired channel. The second BS transmits a handoff response message with a bypass flag set to false to the first BS over the network on the wired channel according to the bypass flag set to false in the handoff notification message. The first BS transmits a handoff acknowledgement message to the MS.

In the handoff negotiations step, the first BS transmits a handoff notification message with a bypass flag set to true to the second BS via the MS on a radio channel, if the bypass flag in the handoff request message is true. Upon reception of the handoff notification message with the bypass flag set to true, the second BS transmits a handoff response message with a bypass flag set to true to the first BS via the MS on the radio channel.

In the handoff negotiations step, the first BS determines whether the number of hops between the first BS and the second BS is greater than a predetermined threshold, or if the number of hops is unmeasurable, if the bypass flag in the handoff request message is true. If the number of hops is less than the threshold, the first BS transmits a handoff notification message with a bypass flag set to false to the second BS over the network on the wired channel. Then, the second BS transmits a handoff response message with a bypass flag set to false to the first BS over the network on the wired channel.

If the number of hops is greater than the threshold or is unmeasurable, the first BS transmits a handoff notification message with a bypass flag set to true to the second BS via the MS on the radio channel. The second BS then transmits a handoff response message with a bypass flag set to true to the first BS via the MS on the radio channel.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In an IP-based radio network environment, two inter-technology handoff scenarios exist: inter-technology handoff within the same IP subnet and inter-technology handoff between different IP subnets. In the latter case, service providers or network configurations can be different. Yet, it is presupposed that the different IP subnets each have a transport layer.

Figure 3A:
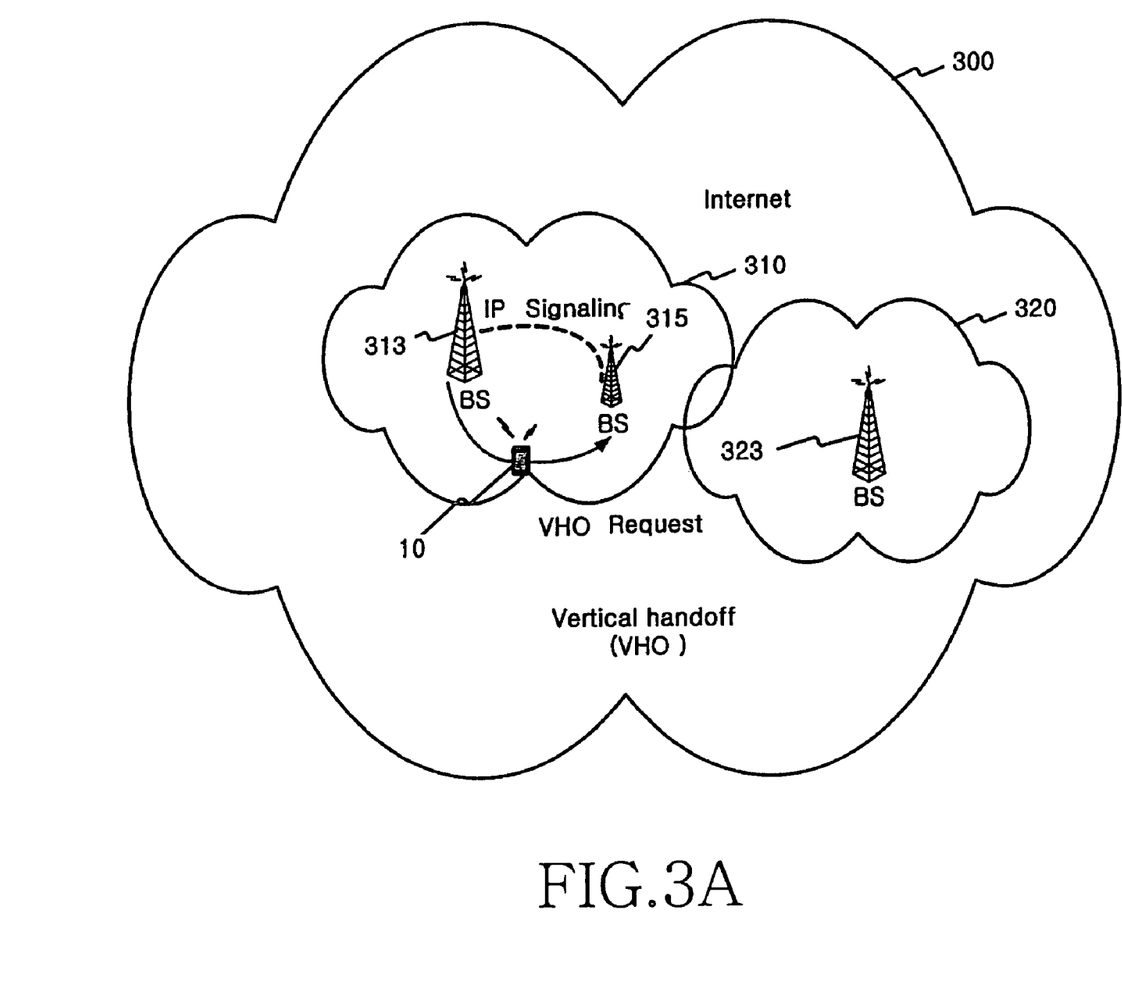
FIG. 3A is a conceptual view illustrating a handoff between different BSs in the same IP subnet according to the present invention.

FIG. 3A is a conceptual view illustrating a vertical handoff (VHO) between different BSs in the same IP subnet according to the present invention. Referring to FIG. 3A, two IP subnets 310 and 320 are connected to an Internet 300 via their respective subnet routers and gateway routers (not shown). The IP subnets 310 and 320 each have a plurality of BSs with their respective service areas. Under this network environment, an MS 10 attempts a VHO from an old BS 313 to a new BS 315 within the first IP subnet 310.

Figure 3B:
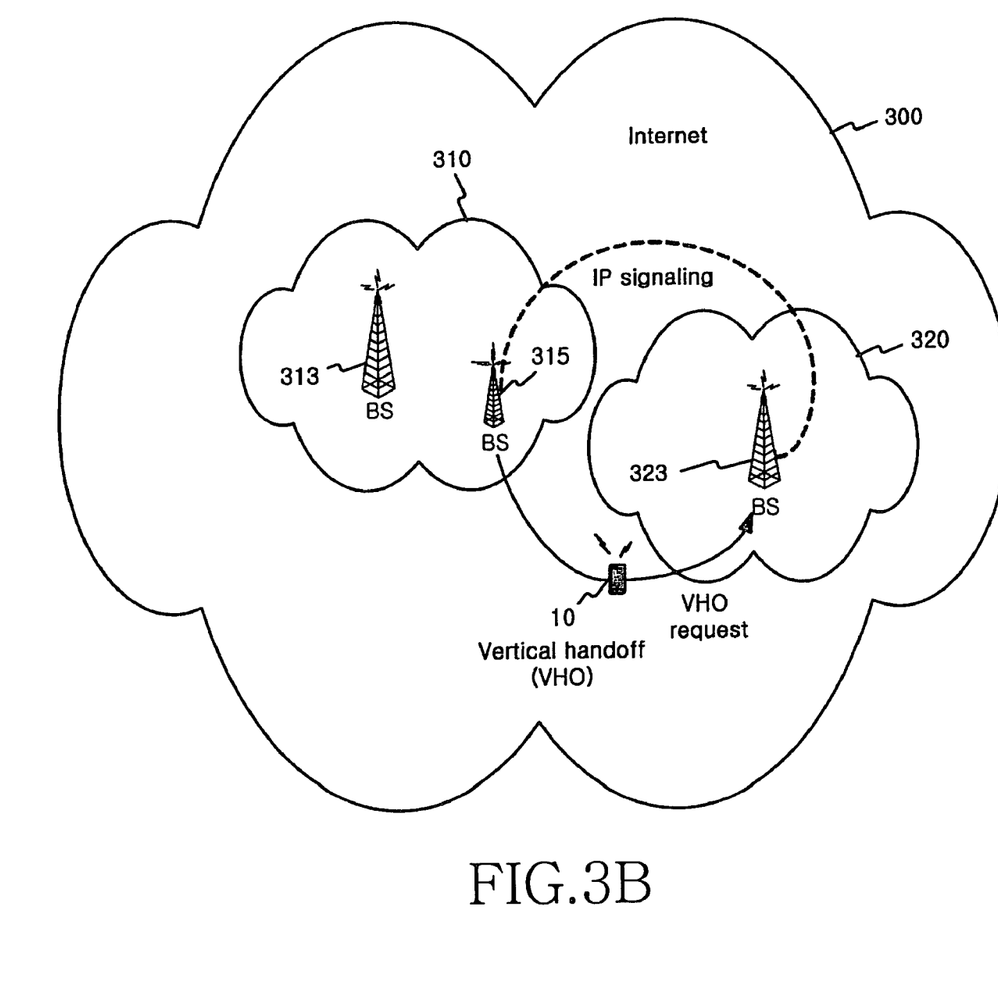
FIG. 3B is a conceptual view illustrating a handoff between different BSs in different IP subnets according to the present invention.

FIG. 3B is a conceptual view illustrating a VHO between BSs in different IP subnets according to the present invention. Referring to FIG. 3B, the MS 10 attempts a VHO from an old BS 315 in the first IP subnet 310 to a new BS 323 in the second IP subnet 320.

A handoff method of the present invention is equally applicable to a VHO between different BSs within the same IP subnet and a VHO between different BSs in different IP subnets.

For handoff purposes, an MS achieves L3 information (the IP address of a BS or a router connected to the BS) required for a VHO in an L2 connection establishment procedure with the BS. When the VHO is decided through negotiations between BSs, VHO is performed rapidly using the L3 information.

The inter-technology handoff method of the present invention provides a signaling scheme to support an IP-based inter-technology handoff using various parameters by an MS or according to a network policy. The MS, which has knowledge of BSs transmitting receivable signals in its cell, decides a VHO according to a handoff policy considering cost, QoS and mobility, and attempts an L2 connection to a new BS. The new BS transmits to the MS a message indicating success of the L2 connection after authentication and registration of the MS. The message contains the IP address of the new BS or the IP address of an access router connected to the new BS. The MS then transmits a VHO request message containing the IP address to the old BS. The old BS transmits a handoff message to the IP address over an IP network. After negotiation between the two networks or the BSs, the old BS notifies the MS of the handoff result and necessary information. This IP-based handoff signaling is applicable to any IP-based network and thus has good expandability. Upon receipt of the handoff result, the MS receives an IP data service without interruptions.

To describe the above handoff procedure in more detail, in the case of a VHO between different BSs within the same IP subnet, once the VHO is decided through handoff signaling, data is forwarded from the old BS to the new BS or transmitted to the new BS by a data routing method defined in the network. In the case of a VHO between different BSs in different IP subnets, the MS tells the old BS by a VHO request message that a mobile IP operation is required, or the old BS, receiving the VHO request message, recognizes the need of the mobile IP operation by comparing its IP address with the IP address of the new BS. After the VHO is decided through handoff signaling between the two BSs, the mobile IP operation is performed so that data is forwarded from the old BS to the new BS, or a router connected to the old BS, receiving handoff information, forwards the data to a router connected to the new BS. Hence, the MS receives the IP data service without interruption during the handoff.

In summary, during a VHO handoff to a different BS during an ongoing IP data service, once an old BS determines that the VHO to the new BS is successful through an L2 connection between the MS and the new BS and handoff negotiations between the old BS and the new BS by IP signaling, data transmission is available between the MS and the new BS while the old BS or new BS resets a routing path by a mobile IP operation. Therefore, a service delay involved in the mobile IP operation is reduced. The handoff signaling procedure of the present invention is configured so as to realize an operation for supporting mobility in an IP layer and reduce a service delay of the operation. Because the Mobile Internet Protocol version 6 (MIPv6) standardization is not yet completed and various algorithms for mobility support can be applied to the network, the BS realizes the IP mobility support operation during the handoff signaling, to thereby forward or transmit data at an appropriate time point during the handoff signaling.

Figure 4:
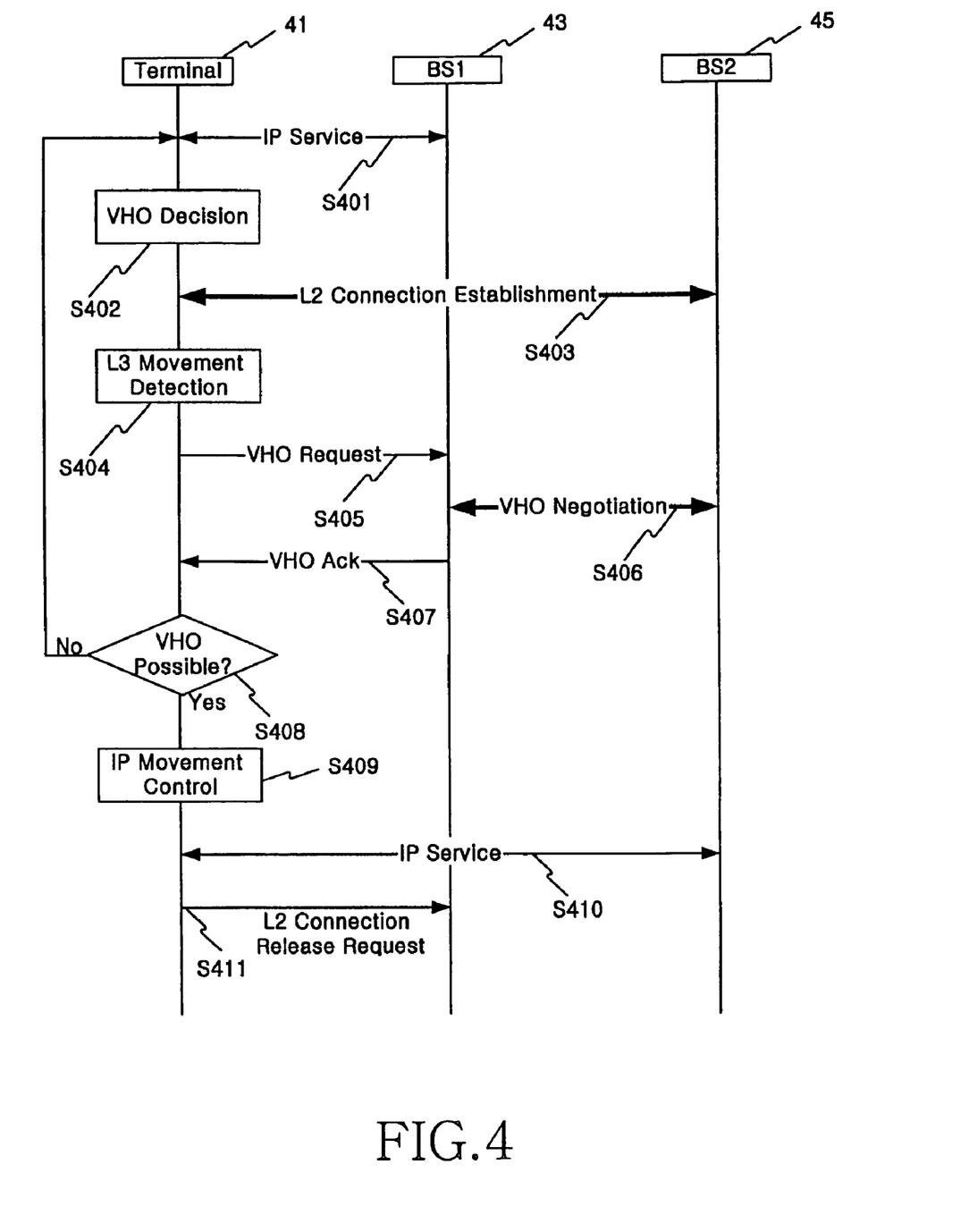
FIG. 4 is a flow diagram illustrating a signal flow for an IP-based inter-technology handoff according to a preferred embodiment of the present invention.

FIG. 4 is a flow diagram illustrating a signal flow for an IP-based inter-technology handoff according to the preferred embodiment of the present invention.

Referring to FIG. 4, it is presupposed that an MS terminal 41 is in a handoff situation from an old BS 43 (BS1) to a new BS 45 (BS2) having different radio interfaces.

The MS 41 detects L3 movement through an L2 connection to BS2. When the handoff is accepted through negotiations between BS1 and BS2, the MS 41 determines whether a routing resetting operation is required such as a mobile IP operation. BS1 and BS2 can determine whether the MS 41 will invoke the mobile IP operation through VHO signaling. According to the routing path resetting of the MS 41, both the BSs operate in two ways.

In the case of a VHO between BS1 and BS2 within the same IP subnet, when the VHO is permitted between them through handoff signaling, BS1 transmits data to BS2, or forwards the data by a method defined in the network so that the data reaches the new BS.

In the case of a VHO between BS1 and BS2 in different IP subnets, after the VHO is permitted through handoff signaling, BS1 forwards data to BS2 or transmits data to the MS 41 and BS2 while the MS 41 receives a VHO ACK message and performs a routing path resetting operation such as a mobile IP operation.

Referring to FIG. 4, the MS 41 is receiving an IP service from BS1 in step S401. When the MS 41 decides a VHO due to a communication environmental change during the IP service in step S402, it establishes an L2 connection to BS2 in step S403. The MS 41 detects L3 movement from IP-related information received during the L2 connection establishment in step S404. BS1 and BS2, which are connected by a VHO request message transmitted from the MS 41 in step S405, conduct VHO negotiations in step S406. In step S407, BS1 transmits a VHO ACK message to the MS 41. The MS 41 determines by the VHO ACK message whether the VHO is possible in step S408. If the VHO is not possible, the MS 41 maintains the ongoing IP service. On the contrary, if the VHO is possible, the MS 41 performs an IP mobility control operation considering the detected L3 movement state in step S409 and receives the IP service from BS2 in step S410. In step S411, the MS transmits an L2 Connection Release Request message to BS1, thereby completing the VHO.

In accordance with the handoff method of the present invention, for a fast handoff, an old BS and a new BS each transmit L3 information containing their IP addresses or the IP addresses of their connected routers to an MS during an L2 connection establishment.

After the new BS authenticates the MS that requests the connection, it transmits to the MS a message indicating a successful L2 connection containing its IP address or the IP address of its connected router. Therefore, the MS can recognize the IP subnet of the new BS. This L2 connection establishment procedure enables fast IP-based VHO signaling and movement detection in the IP layer. Thus, the MS can predict and prepare for an operation for supporting movement in the IP layer.

Figure 5:
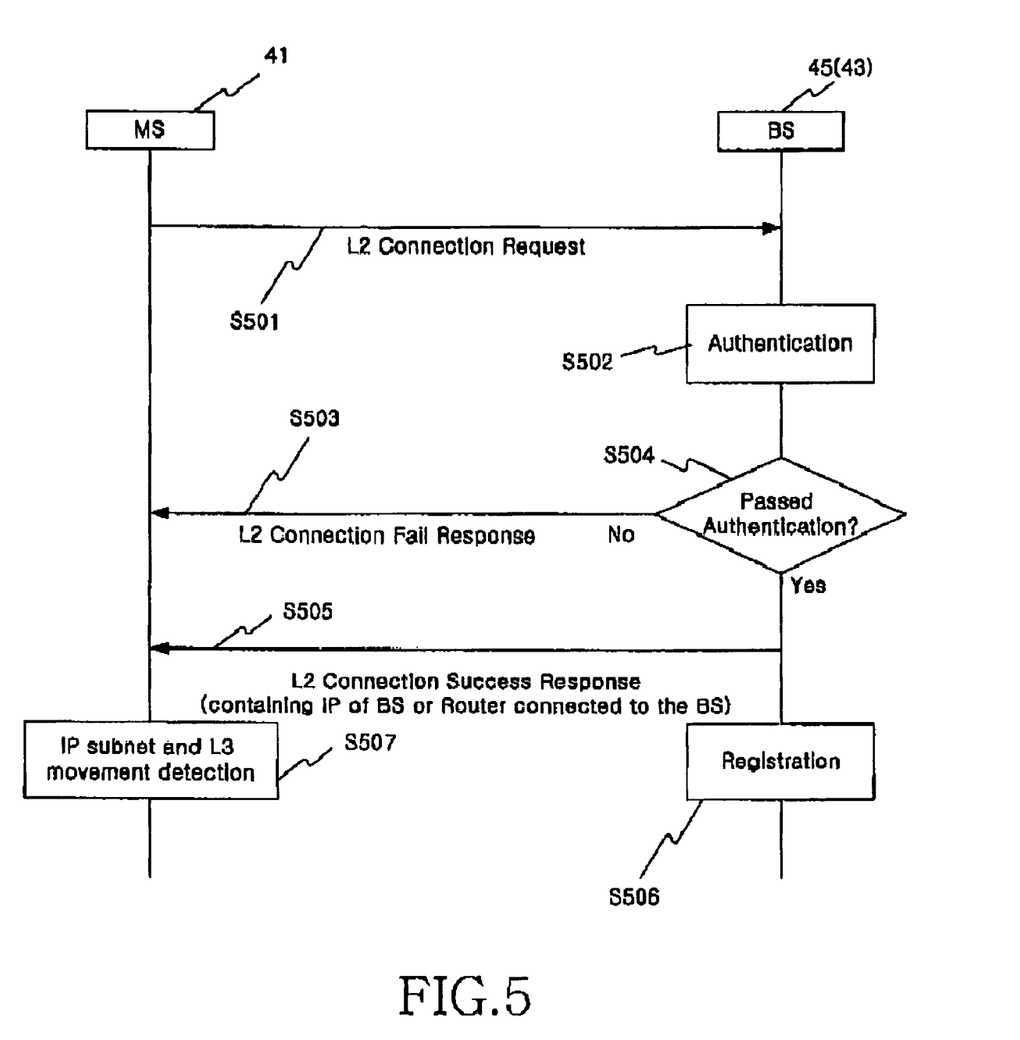
FIG. 5 is a flow diagram illustrating a detailed signal flow for L2 connection establishment illustrated in FIG. 4.

FIG. 5 is a flow diagram illustrating a signal flow for the L2 connection establishment illustrated in FIG. 4. Referring to FIG. 5, the MS 41 transmits an L2 Connection Request message to BS1 or BS2 in step S501. BS2 authenticates the MS 41 in step S502. If the authentication fails in step S504, BS2 transmits an L2 Connection Fail Response message to the MS 41 in step S503. On the other hand, if the authentication is passed, BS2 transmits an L2 Connection Success Response message to the MS 41 in step S505 and registers the MS 41 in step S506. The L2 Connection Success Response message contains IP information including the IP address of BS2 or a router connected to BS2. The MS 41 detects an IP subnet and L3 movement using the IP information in step S507.

The VHO negotiations between BS1 and BS2 illustrated in FIG. 4 can be carried out in connection with the MS 41 or directly between BS1 and BS2 without involving the MS 41.

A signaling path for the VHO negotiations can be determined by the MS 41 or BS1.

In accordance with the signaling path setting method of the present invention, an MS, which has succeeded in connecting to a new BS, determines whether it can be connected simultaneously to an old BS and the new BS, considering its structure and a handoff decision method, and transmits to the old BS a VHO Request message containing a bypass flag indicating whether the MS uses two channels. If the two channels are used, the bypass flag is set to true and otherwise, it is set to false. The old BS determines a VHO signaling path by the VHO Request message. That is, the old BS determines based on the bypass flag indicating the IP address of the new BS and the channel state of the MS whether to transmit a handoff message to the new BS through the MS wirelessly or over an IP wired network. In the former case, the old BS transmits a handoff message with a bypass flag set to true to the MS and the MS transmits the handoff message to the new BS. This signaling setting saves resources and reduces time delay for the VHO signaling according to the structure and channel state of the MS.

Figure 6:
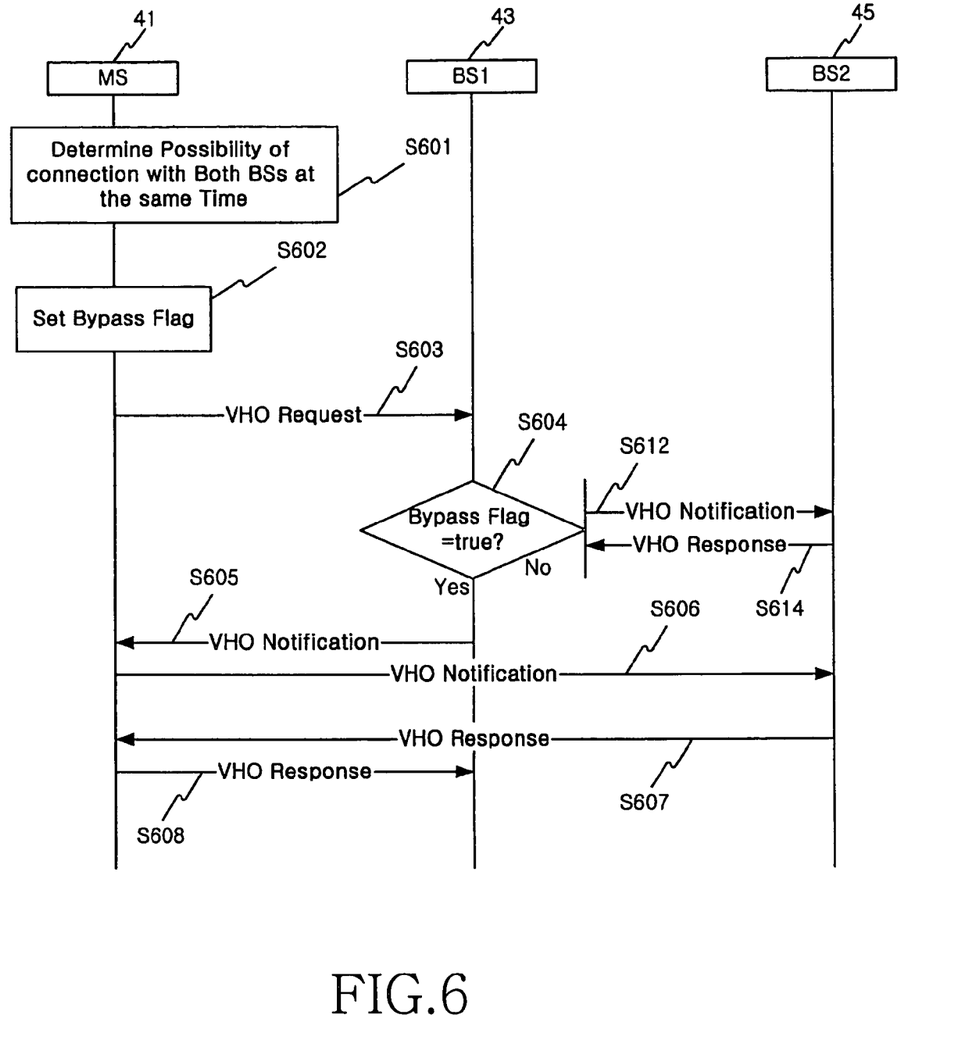
FIG. 6 is a flow diagram illustrating a signal flow in the case where an MS determines a signaling path according to the preferred embodiment of the present invention.

FIG. 6 is a flow diagram illustrating a signal flow in the case where an MS determines a signaling path according to the preferred embodiment of the present invention. Referring to FIG. 6, the MS 41 determines whether it is possible to connect to both BS1 and BS2 at the same time according to the structure of the MS 41 and the adopted handoff decision method in step S601 in the VHO request step illustrated in FIG. 4. If it is possible, the MS 41 sets a bypass flag to true or if it is impossible, the MS 41 sets the bypass flag to false in step S602 and transmits a VHO Request message containing the bypass flag to BS1 in step S603. BS1 checks the bypass flag in step S604. If the bypass flag is true, BS1 transmits a VHO Notification message with a bypass flag set to true to the MS 41 in step S605. The MS 41 forwards the VHO Notification message without additional processing to BS2 in step S606. BS2 transmits a VHO Response message with a bypass flag set to true to the MS 41 in step S607 and the MS 41 forwards the VHO Response message without additional processing to BS1 in step S608.

On the other hand, if the bypass flag is set to false in step S-604, BS1 transmits a VHO Notification message to BS2 over an IP network in step S612 and BS2 transmits a VHO Response message directly to BS1 over the IP network in step S614.

Figure 7:
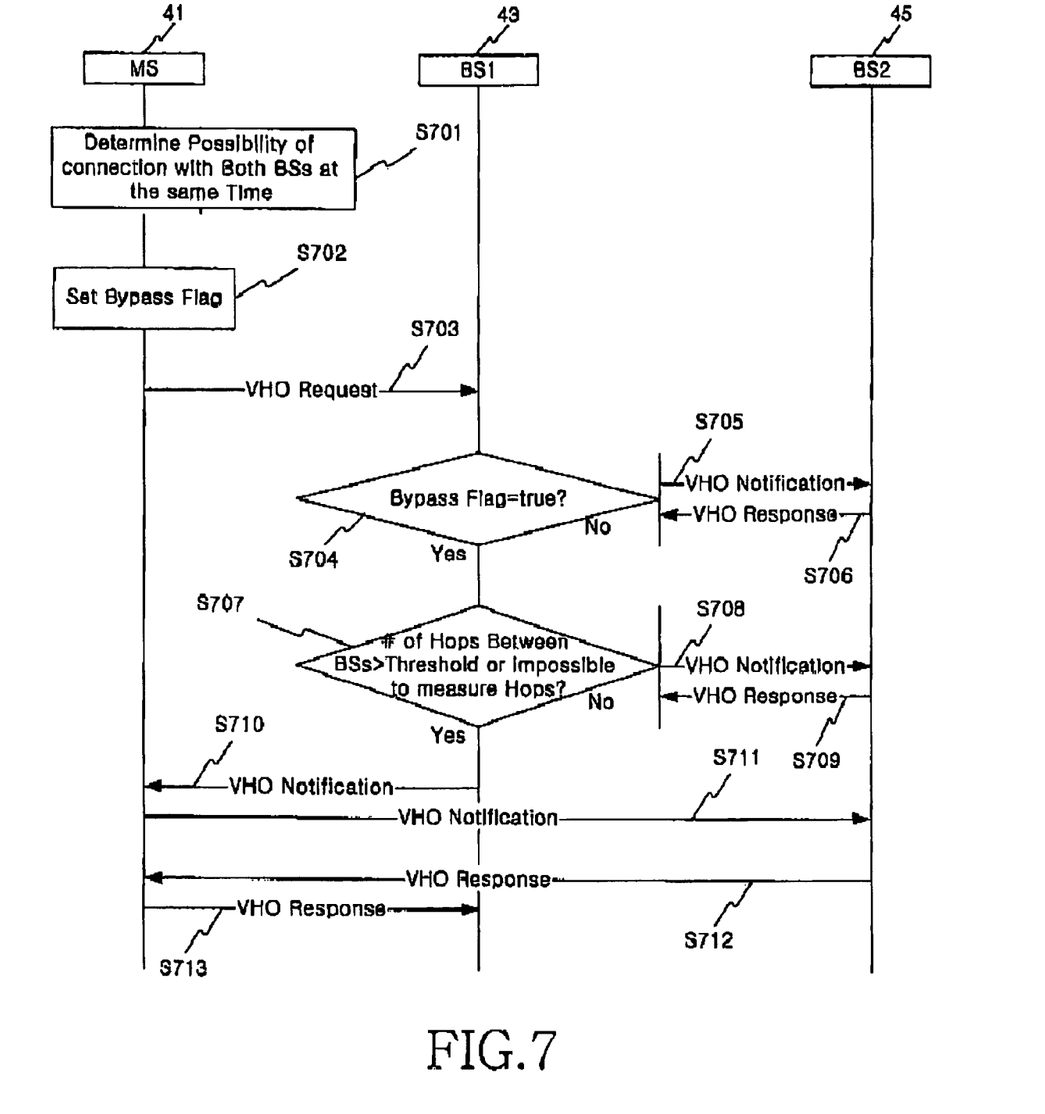
FIG. 7 is a flow diagram illustrating a signal flow in the case where a BS determines a signaling path according to the preferred embodiment of the present invention.

FIG. 7 is a flow diagram illustrating a signal flow in the case where a BS determines a signaling path according to the preferred embodiment of the present invention. Referring to FIG. 7, the MS 41 determines whether it is possible to connect to both BS1 and BS2 at the same time according to the structure of the MS 41 and the adopted handoff decision method in step S701. If it is possible, the MS 41 sets a bypass flag to true or if it is impossible, the MS 41 sets the bypass flag to false in step S702 and transmits a VHO Request message containing the bypass flag to BS1 in step S703. BS1 checks the bypass flag in step S704. If the bypass flag is false, BS1 transmits a VHO Notification message to BS2 over an IP network in step S705 and BS2 transmits a VHO Response message to BS1 over the IP network in step S706.

On the contrary, if the bypass flag is true, BS1 determines whether the number of hops between BS1 and BS2 is greater than a predetermined threshold if it is or unmeasurable in step S707. If the number of hops is measurable and less than the threshold, BS1 transmits the VHO Notification message to BS2 over the IP network in step S708 and BS2 transmits the VHO Response message to BS1 over the IP network in step S709.

If the number of hops is greater than the threshold or is unmeasurable in step S707, BS1 transmits a VHO Notification message with a bypass flag set to true to the MS 41 in step S710. The MS 41 forwards the VHO Notification message without additional processing to BS2 in step S711. BS2 transmits a VHO Response message with a bypass flag set to true to the MS 41 in step S712 and the MS 41 forwards the VHO Response message without additional processing to BS1 in step S713.

In the handoff method of the present invention as described above, the moment a handoff is decided through handoff negotiations, an old BS transmits IP service data for an MS to a new BS, thereby minimizing a service delay involved in routing path resetting and a mobility operation for the routing path resetting.

Also, a signaling path is selectively set depending on the possibility of concurrent connection between the MS and both the old and new BSs in an IP signaling for handoff between the BSs. Thus, a fast, reliable handoff can be implemented.

While the invention has been shown and described with reference to a certain preferred embodiments thereof, it will be understood by those skilled in the art that various changes in form and details may be made therein without departing from the spirit and scope of the invention as defined by the appended claims.

What is claimed is:

1. A handoff method in a communication system where base stations (BSs) providing different radio access interfaces to a mobile station (MS) are connected to a network through routers, comprising the steps of:
   a) deciding a handoff from a first BS to a second BS for an MS that receives service data of a predetermined network layer from the first BS;
   b) establishing a link layer connection between the MS and the second BS and providing network layer information containing a network layer address of the second BS or a network layer address of a router connected to the second BS to the MS by the second BS;
   c) detecting movement of the MS in the network layer during the link layer connection establishment;
   d) conducting handoff negotiations between the first and second BSs if the movement of the MS in the network layer is detected;
   e) determining whether the handoff is available according to the negotiations;
   f) performing mobility management control considering movement of the MS if the handoff is available;
   g) transmitting the service data of the network layer to the MS in a network path reset to the second BS by the mobility management control; and
   h) releasing a link layer connection between the MS and the first BS if the movement of the MS in the network layer is detected,
   wherein step c) comprises the steps of:
      comparing the network layer address of the second BS or the router connected to the second BS with the network layer address of the first BS or a router connected to the first BS; and
      determining whether the movement of the MS is within the same subnet or to a different subnet according to the comparison result, and
   wherein step d) comprises the steps of:
      determining whether it is possible to concurrently connect the MS to both the first and second BSs;
      transmitting a handoff request message with a bypass flag set to true for conducting the handoff negotiations via the MS on the radio channel if concurrent connection is possible; and
      transmitting the handoff request message with a bypass flag set to false for conducting the handoff negotiations over the network if concurrent connection is impossible.

2. The handoff method of claim 1, wherein step d) is performed in the network layer.

3. The handoff method of claim 1, wherein step d) comprises the steps of: requesting the handoff by the MS; and notifying the MS of the result of the handoff negotiations by the first BS or the second BS.

4. The handoff method of claim 1, wherein step f) comprises the step of performing the mobility management control by a mobile IP (MIP) operation.

5. The handoff method of claim 1, wherein step b) comprises the steps of: requesting the link layer connection to the second BS in a link layer connection request message by the MS; authenticating the MS using information included in the link layer connection request message by the second BS; and notifying the MS of completion of the link layer connection in a link layer connection success response message by the second BS, if the MS passes the authentication.

6. The handoff method of claim 5, wherein the link layer connection success response message contains the network layer address of the second BS or the router connected to the second BS.

7. The handoff method of claim 5, wherein step b) further comprises the step of transmitting the same data as the network service data transmitted to the MS to the second BS by the first BS when the first BS receives the link layer connection success response message.

8. The handoff method of claim 1, wherein step d) comprises the step of conducting the handoff negotiations between the first and second BSs over the network on a wired channel.

9. The handoff method of claim 1, wherein step d) further comprises the steps of:
   transmitting the handoff request message with the bypass flag set to true or false according to the determination to the first BS by the MS; transmitting a handoff notification message with a bypass flag set to false to the second BS over the network on a wired channel by the first BS, if the bypass flag in the handoff request message is false;

transmitting a handoff response message with a bypass flag set to false to the first BS over the network on the wired channel according to the bypass flag set to false in the handoff notification message by the second BS; and transmitting a handoff acknowledgement message to the MS by the first BS.

10. The handoff method of claim 9, wherein step d) further comprises the steps of: transmitting a handoff notification message with a bypass flag set to true to the second BS via the MS on a radio channel by the first BS, if the bypass flag in the handoff request message is true; and transmitting a handoff response message with a bypass flag set to true to the first BS via the MS on the radio channel according to the bypass flag set to true in the handoff notification message by the second BS.

11. The handoff method of claim 9, wherein step d) further comprises the steps of: determining whether a number of hops between the first BS and the second BS is greater than a predetermined threshold, or is unmeasurable by the first BS, if the bypass flag in the handoff request message is true; transmitting a handoff notification message with a bypass flag set to false to the second BS over the network on the wired channel by the first BS, if the number of hops is less than the threshold; and transmitting a handoff response message with a bypass flag set to false to the first BS over the network on the wired channel by the second BS, if the bypass flag in the handoff notification message is false.

12. The handoff method of claim 11, wherein step d) comprises the steps of:
transmitting a handoff notification message with a bypass flag set to true to the second BS via a MS on the radio channel by the first BS, if the number of hops is greater than the threshold or is unmeasurable; and
transmitting a handoff response message with a bypass flag set to true to the first BS via the MS on the radio channel by the second BS, if the bypass flag in the handoff notification message is true.

13. A handoff method in a communication system where base stations (BSs) providing different radio access interfaces to a mobile station (MS) are connected to an Internet Protocol (IP)-based network through routers, comprising the steps of:
(a) deciding a handoff from a first BS to a second BS for an MS that receives IP service data from the first BS;
(b) establishing a link layer (L2) connection between the MS and the second BS and providing network layer information containing a network layer address of the second BS or a network layer address of a router connected to the second BS to the MS by the second BS;
(c) detecting movement of the MS in the IP network during the L2 connection establishment;
(d) conducting handoff negotiations between the first and second BSs by IP signaling if the movement of the MS in the IP network is detected;
(e) determining whether the handoff is available according to the negotiations;
(f) performing mobility management control considering movement of the MS if the handoff is available;
(g) transmitting the IP service data to the MS in a network path reset to the second BS by the mobility management control; and
(h) releasing an L2 connection between the MS and the first BS,
wherein step (c) comprises the steps of:
comparing the IP address of the second BS or the router connected to the second BS with a known IP address of the first BS or a router connected to the first BS; and
determining whether movement of the MS is within the same subnet or to a different subnet according to the comparison result, and
wherein step (d) comprises the steps of:
determining whether it is possible to concurrently connect the MS to both the first and second BSs;
transmitting a handoff request message with a bypass flag set to true for conducting the handoff negotiations via the MS on the radio channel if concurrent connection is possible; and
transmitting the handoff request message with a bypass flag set to false for conducting the handoff negotiations over the network if concurrent connection is impossible.

14. The handoff method of claim 13, wherein step (f) comprises the step of performing the mobility management control by a mobile IP (MIP) operation.

15. The handoff method of claim 13, wherein step (b) comprises the steps of:
requesting the L2 connection to the second BS in an L2 connection request message by the MS;
authenticating the MS based on the L2 connection request message by the second BS; and
notifying the MS of completion of the L2 connection in an L2 success response message containing the IP address of the second BS or a router connected to the second BS by the second BS, if the MS passes the authentication.

16. The handoff method of claim 15, wherein step (b) further comprises the step of transmitting the same data as the IP service data transmitted to the MS to the second BS by the first BS when the first BS receives the 12 connection success response message.

17. The handoff method of claim 13, wherein step (d) further comprises the step of
conducting the handoff negotiations over a wired IP network if concurrent connection is impossible.

18. The handoff method of claim 1, wherein step (d) further comprises the steps of:
transmitting the handoff request message with the bypass flag set to true or false according to the determination to the first BS by the MS;
transmitting a handoff notification message with a bypass flag set to false to the second BS over the network on a wired channel by the first BS, if the bypass flag in the handoff request message is false;
transmitting a handoff response message with a bypass flag set to false to the first BS over the network on the wired channel according to the bypass flag set to false in the handoff notification message by the second BS; and
transmitting a handoff acknowledgement message to the MS by the first BS.

19. The handoff method of claim 18, wherein step (d) further comprises the steps of:
transmitting a handoff notification message with a bypass flag set to true to the second BS via the MS on a radio channel by the first BS, if the bypass flag in the handoff request message is true; and
transmitting a handoff response message with a bypass flag set to true to the first BS via the MS on the radio channel according to the bypass flag set to true in the handoff notification message by the second BS.

20. The handoff method of claim 18, wherein step d) further comprises the steps of:
determining whether a number of hops between the first BS and the second BS is greater than a predetermined threshold, or is unmeasurable by the first BS, if the bypass flag in the handoff request message is true;

transmitting a handoff notification message with a bypass flag set to false to the second BS over the network on the wired channel by the first BS, if the number of hops is less than the threshold; and transmitting a handoff response message with a bypass flag set to false to the first BS over the network on the wired channel by the second BS, if the bypass flag in the handoff notification message is false.

21. The handoff method of claim 20, wherein step (d) comprises the steps of:

transmitting a handoff notification message with a bypass flag set to true to the second BS via the MS on a radio channel by the first BS, if the number of hops is greater than the threshold or is unmeasurable; and transmitting a handoff response message with a bypass flag set to true to the first BS via the MS on the radio channel by the second BS, if the bypass flag in the handoff notification message is true.

22. A method of setting a handoff signaling path at a handoff of a mobile station (MS) from a first base station (BSS providing an Internet Protocol (IP) service to the MS to a second BS in a communication system where BSs providing different radio access interfaces to MSs are connected to an IP-based network through routers, the method comprising the steps of:

determining whether it is possible to concurrently connect the MS to both the first and second BSs and transmitting a handoff request message with a bypass flag set to true for conducting the handoff negotiations via the MS on a radio channel if concurrent connection is possible;

transmitting a handoff notification message with a bypass flag set to true to the second BS via the MS on the radio channel by the first BS, if the bypass flag in the handoff request message is true;

transmitting a handoff response message with a bypass flag set to true to the first BS via the MS on the radio channel according to the bypass flag set to true in the handoff notification message by the second BS; and transmitting a handoff acknowledgement message to the MS by the first BS; and transmitting the handoff request message with the bypass flag set to false for conducting the handoff negotiations over the network if concurrent connection is impossible.

23. The method of claim 22, further comprising the steps of:

transmitting a handoff notification message with a bypass flag set to false to the second BS over the network on a wired channel by the first BS, if the bypass flag in the handoff request message is false; and transmitting a handoff response message with a bypass flag set to false to the first BS over the network on the wired channel according to the bypass flag set to false in the handoff notification message by the second BS.

24. The method of claim 22, further comprising the steps of:

determining whether a number of hops between the first BS and the second BS is greater than a predetermined threshold, or a unmeasurable by the first BS, if the bypass flag in the handoff request message is true;

transmitting a handoff notification message with a bypass flag set to false to the second BS over the network on the wired channel by the first BS, if the number of hops is less than the threshold; and transmitting a handoff response message with a bypass flag set to false to the first BS over the network on the wired channel by the second BS, if the bypass flag in the handoff notification message is false.

25. The method of claim 24, further comprising the steps of: transmitting a handoff notification message with a bypass flag set to true to the second BS via the MS on a radio channel by the first BS, if the number of hops is greater than the threshold or is unmeasurable; and transmitting a handoff response message with a bypass flag set to true to the first BS via the MS on the radio channel by the second BS, if the bypass flag in the handoff notification message is true.

* * * * *